Figure 2:
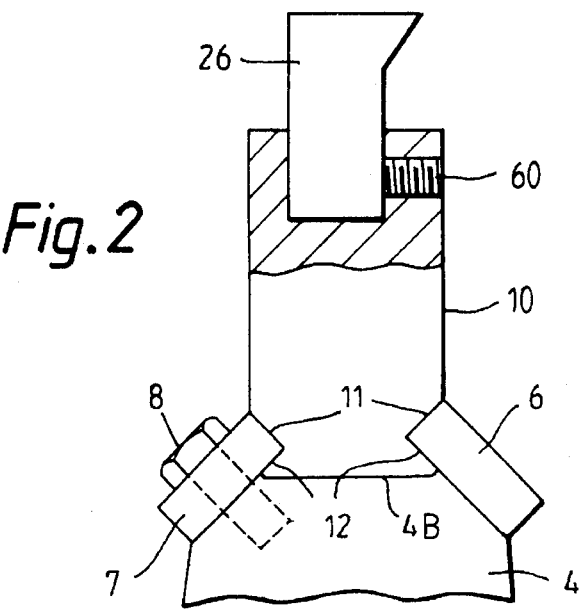

United States Patent [19]

McMurtry et al.

[11] Patent Number: 5,478,300
[45] Date of Patent: Dec. 26, 1995

[54] AUTOMATED ARTEFACT HANDLING SYSTEM FOR MACHINE TOOLS

[75] Inventors: David R. McMurtry, Wotton-Under-Edge; Marc T B Saunders, Cheltenham; Nicholas A. James; Mark A. Buckingham, both of Wotton-Under-Edge, all of United Kingdom

[73] Assignee: Renishaw Metrology Limited, Gloucestershire, England

[21] Appl. No.: 969,311

[22] PCT Filed: Jun. 18, 1992

[86] PCT No.: PCT/GB92/01103

§ 371 Date: Mar. 3, 1993

§ 102(e) Date: Mar. 3, 1993

[87] PCT Pub. No.: WO92/22785

PCT Pub. Date: Dec. 23, 1992

[30] Foreign Application Priority Data

Jun. 18, 1991 [GB] United Kingdom .......... 9113115
Mar. 26, 1992 [GB] United Kingdom .......... 9206813

[51] Int. Cl.⁶ .................................. B23Q 3/157
[52] U.S. Cl. ...................... 483/1; 483/15; 483/64
[58] Field of Search ................ 483/1, 13–15, 483/25, 64; 29/33 J, 33.5

[56] References Cited

U.S. PATENT DOCUMENTS

| 4,185,376 | 1/1980 | Johnstone | 408/6 X |
| 4,237,578 | 12/1980 | Williamson | 483/15 |
| 4,237,598 | 12/1980 | Williamson | 29/563 X |
| 4,266,120 | 5/1981 | Johnstone | 408/6 X |
| 4,369,563 | 1/1983 | Williamson | 29/563 X |
| 4,621,410 | 11/1986 | Williamson | 29/563 X |
| 4,679,286 | 7/1987 | Momoi et al. | 29/33 P |

FOREIGN PATENT DOCUMENTS

| 0002782 | 7/1979 | European Pat. Off. . | |
| 0519638 | 12/1992 | European Pat. Off. . | |
| 0221673 | 5/1985 | Germany | 483/64 |
| 0123243 | 7/1985 | Japan | 483/13 |
| 1263912 | 2/1972 | United Kingdom . | |
| 1435880 | 5/1976 | United Kingdom . | |
| WO91/04127 | 4/1991 | WIPO . | |

Primary Examiner—Daniel W. Howell
Assistant Examiner—Jill DeMello
Attorney, Agent, or Firm—Oliff & Berridge

[57] ABSTRACT

An automatic pallet handling system for a machine tool is described in which the pallets are formed as lightweight cassettes (10) which can be mounted by means of shaped locating features on the external periphery of a receiving device (4) mounted, for example, for rotation with a horizontal indexing spindle (2) in a vertical spindle CNC machine. A portable cassette-loading system (15) which consists of a chain conveyor (17) having links (18) pivotably connected side-by-side and formed from lightweight extrusions is positionable adjacent the machine or removable to a loading station. The extruded links form features for engaging the same cassette-locating features on the cassettes and a transfer mechanism (50) slides the cassettes from the loading conveyor to the periphery of the receiving device. The advantages are that several cassettes holding tools, workpieces or calibration artefacts, all references (26), can be loaded onto or removed from the machine independently of other cassettes which remain in place, to provide great flexibility of operation. The invention can be applied to horizontal spindle CNC machines.

20 Claims, 5 Drawing Sheets

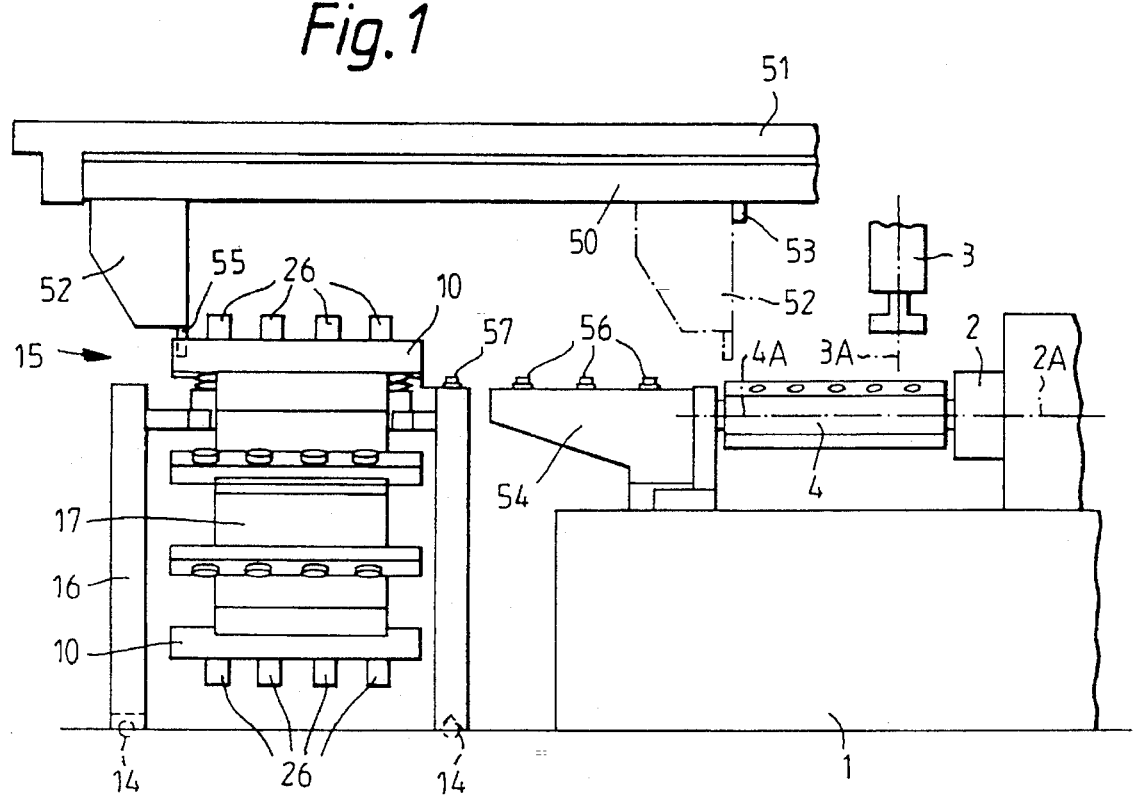
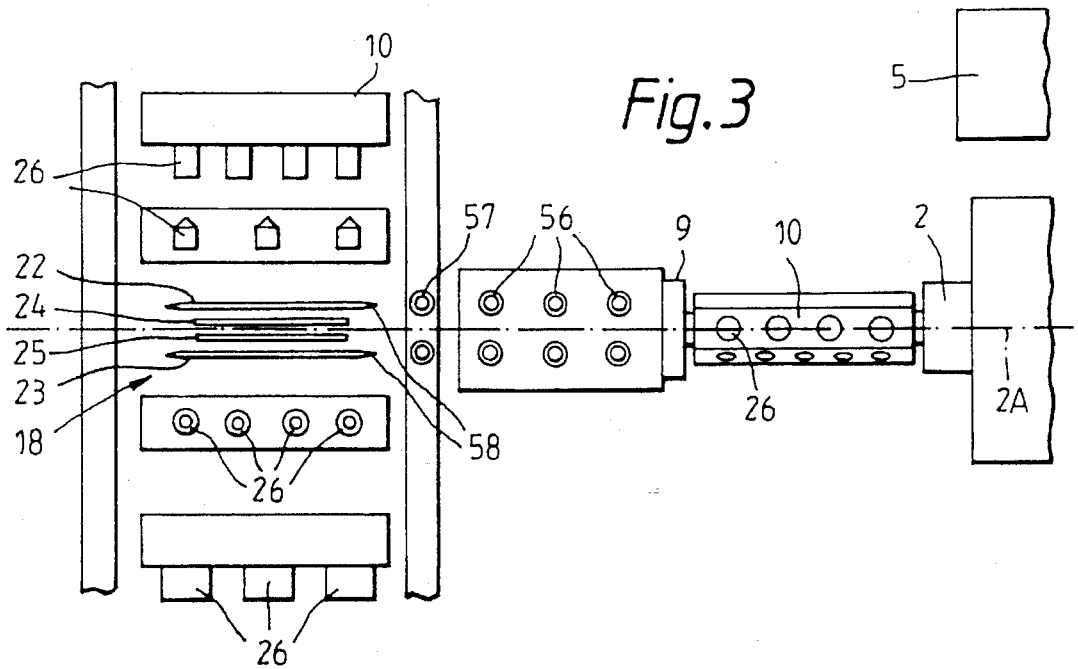

AUTOMATED ARTEFACT HANDLING SYSTEM FOR MACHINE TOOLS

The present invention relates to an automated pallet handling system for machine tools.

It is known, for example, from U.K. Patent Specification No. 1,263,912 to provide a fully automated machine tool installation. In particular this specification describes a machine tool installation in which a machine tool spindle may move between a plurality of artefact containing pallets, which are automatically loaded onto the machine. The artefacts carried by the pallets may be workpieces, chucks, or tools. The spindle is programmed to pick up from a pallet, either a tool with which to perform a machining operation on a workpiece held in another pallet, or a workpiece, which is then transported by the spindle into proximity with static or live tooling on another pallet, to perform a different type of machining operation on the workpiece.

Although such machine tool installations provide great flexibility in the number and type of machining operations which can be carried out in an automated sequence, the pallets are flat and dedicated to one type of tool or workpiece and are expensive to produce.

In our International Application published under the number WO 91/04127 there is described and claimed a multi-fixturing system for a machine in which a plurality of workpiece-providing pallets are mounted on the periphery of a core which is rotatably mounted on the machine. The pallets, which are of a particular type, and are referred to throughout said International Application as cassettes, replace the prior pallets to provide a flexible and relatively inexpensive system.

The present invention is a development of the system described in the above-mentioned International Application by means of which a machine tool installation is adapted for fully automated operation with such pallets or cassettes.

According to the present invention there is provided an automated pallet handling system for a machine tool, the machine tool having an indexing spindle rotatable about a first axis and a machining spindle rotatable about a second axis, the pallet handling system comprising:

- a cassette-receiving device which includes means for accurately locating and clamping cassettes in position thereon, said device being mounted on the indexing spindle of the machine tool for rotation therewith to position the cassettes in relation to the spindle for an operation by the machining spindle on artefacts provided by the cassettes,
- a plurality of artefact-providing cassettes each having locating features thereon for co-operating with the locating and clamping means on the cassette-receiving device,
- a cassette-loading system on which said cassettes are stored which is positionable adjacent to the machine tool and which includes drive means for positioning a desired cassette relative to the cassette-receiving device, and a cassette transfer mechanism for transferring cassettes between the cassette-loading system and the cassette-receiving device, and
- control means for automatically controlling said drive means, said cassette transfer mechanism, the clamping means and said machine tool to provide the correct artefacts to the machine tool in accordance with a pre-programmed sequence of machining operations.

The cassette-receiving device is preferably designed to locate and clamp more than one cassette and the cassette-loading system can be programmed to transfer cassettes from their stored position to the cassette-receiving device independently of each other.

This novel aspect of the invention provides the machine tool with the capability of changing one or more cassettes while others remain stored in the working volume of the machine tool and hence provides a greatly improved flexibility for the machine tool over the standard pallet changing system in which only a single pallet can be positioned in the working volume of the machine tool at any one time.

Another preferred feature of the invention is that each cassette is relatively thin compared to a conventional flat pallet thus allowing them to be stored side by side in much larger numbers on the cassette-loading system, providing the possibility of reduced floor space for storage of the same number of tools and workpieces.

The cassette-loading system is preferably in the form of a chain conveyor of which the links are made from low cost lightweight extrusions. This enables the conveyor loaded with cassettes to De moved manually, preferably on wheels to the vicinity of the machine tool with sufficient workpieces for a lengthy unmanned production run without the need for an automated pallet transporter as found in many conventional FMS systems.

The cassette transfer mechanism is preferably a push-pull device which is capable of moving the cassettes linearly between the loading system and the cassette-receiving device.

Depending on the distance between the cassette-receiving device and the cassette-loading system across which a cassette has to travel during a transfer operation it may be necessary to provide a transfer guide to bridge the gap to ensure the smooth transfer of cassettes from the loading system to the cassette-receiving device and vice versa.

The cassettes may all be designed to be of the same basic shape with the same shape of location feature provided thereon but this is not essential. For example, as long as the locating features on the loading system and the cassette-receiving device are capable of engaging those on the cassettes, any convenient shape may be used.

The artefacts carried by the cassettes may be different depending on the type of machine tool and the types of machining operations to be carried out. However, to obtain the full flexibility of a flexible manufacturing system the cassettes may be designed to hold workpieces, milling cutters or other tools to be picked up by the machining spindle. Other cassettes may be designed to hold turning tools, boring bars, drills or the like in fixed relation to the cassette to enable a workpiece held in the machining spindle to be rotated against the tool for metal removal. The cassettes may themselves act as workpieces and be entirely sacrificial.

In another novel aspect of this invention one or more calibration artefacts having some accurately known dimensions may be provided by the cassettes. The calibration artefacts may be masters of the workpiece being machined, or a standard artefact. The machine tool can then be used with a measuring probe as a measuring system for making accurate comparative measurements between the calibration artefacts and workpieces being machined for determination of tool wear or other faults in the machining operations as described in our U.K. patent application no. 9120022 filed on 19th Sep., 1991. (which corresponds to EP 519638A)

Figure 4:
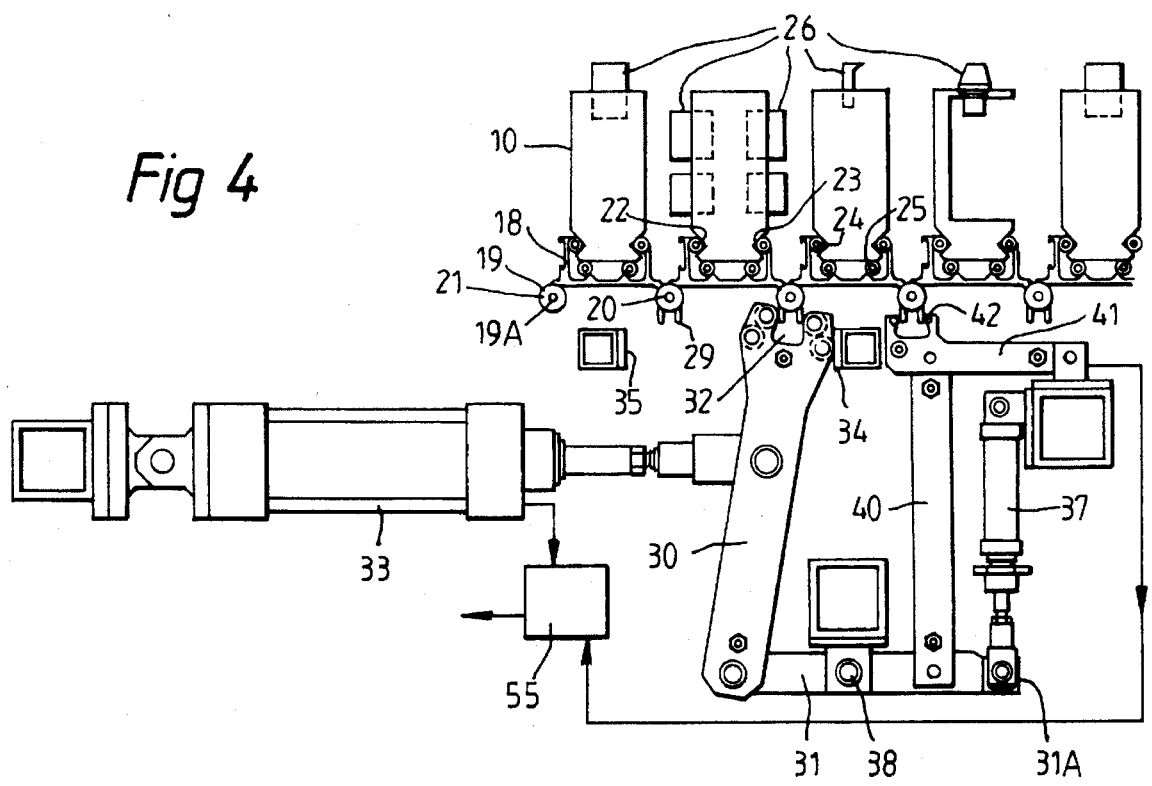

The invention will now be more particularly described, by way of example only, with reference to the accompanying drawings in which:

FIG. 1 is an elevation of part of a machine tool and a cassette-loading system of the present invention, FIG. 2 is an end elevation of a tool-holding cassette on a multiple cassette-receiving device showing a fixed tool in position on the device, FIG. 3 is a plan view of FIG. 1, with a cassette loaded onto the cassette-receiving device, FIG. 4 is an enlarged sectional elevation of the cassette-loading system of the machining system of FIG. 1 showing the drive mechanism of the conveyer.

Figure 5:
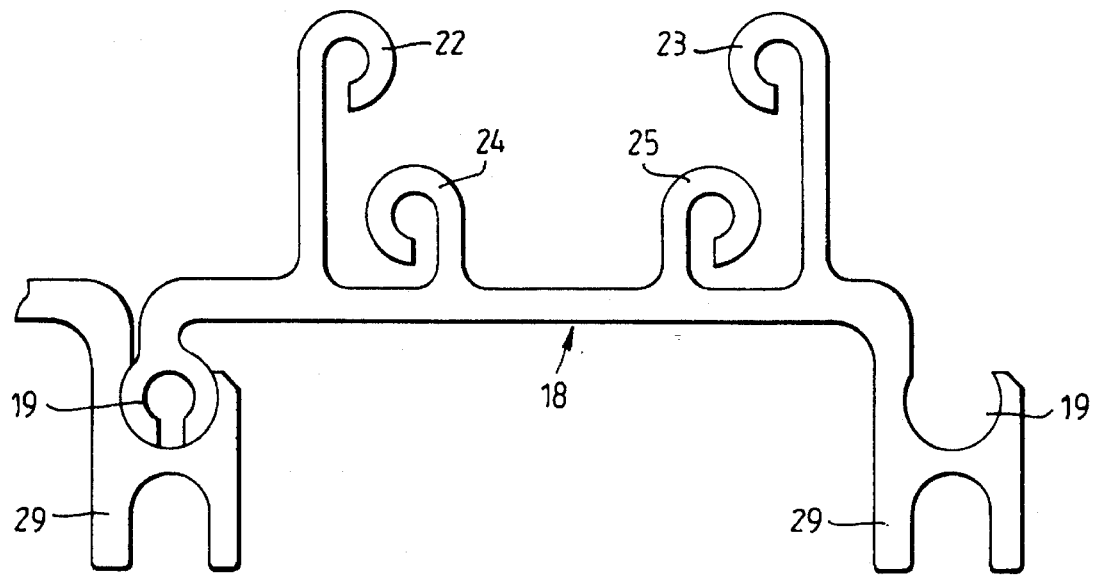
Figure 6:
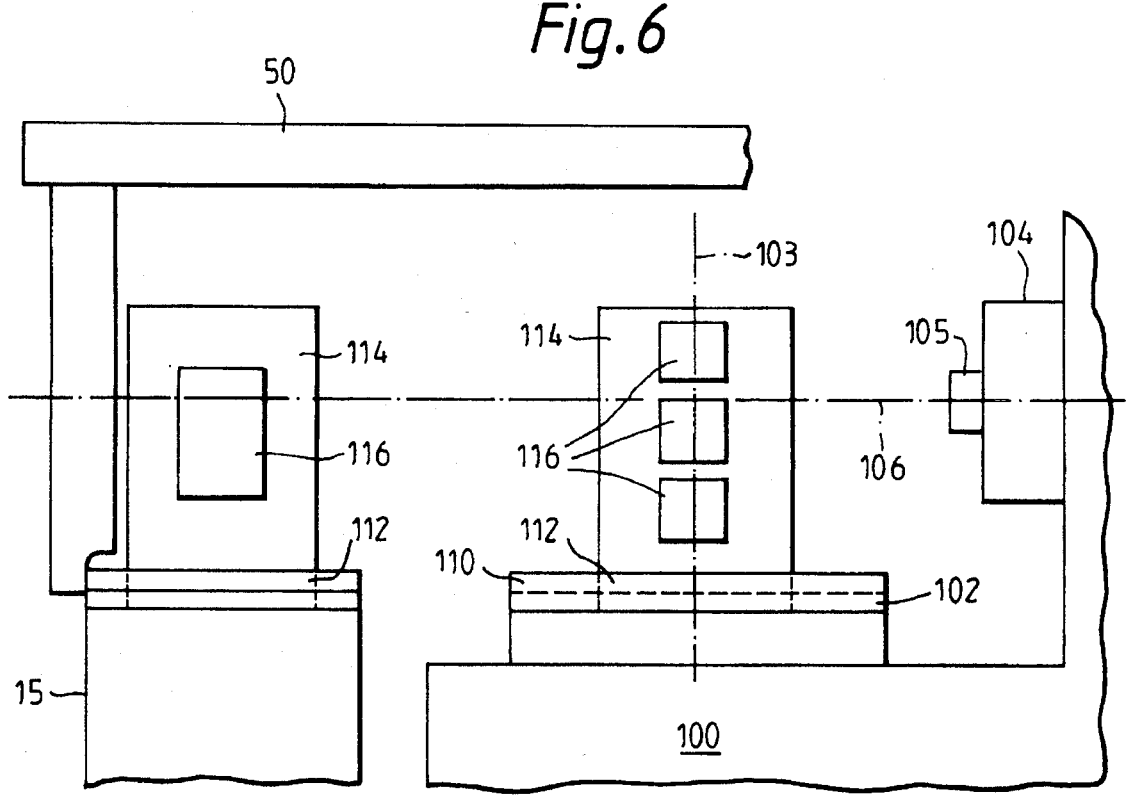
Figure 7:
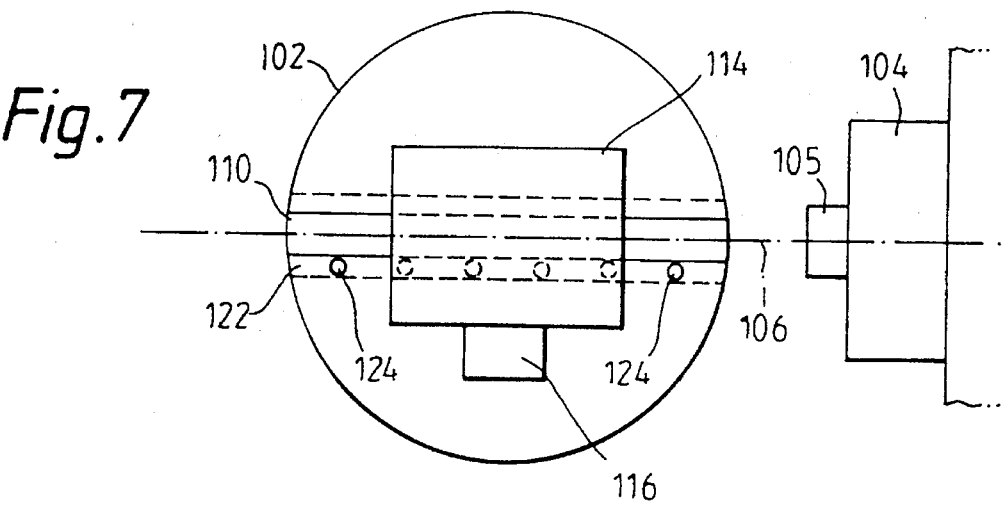
Figure 9:
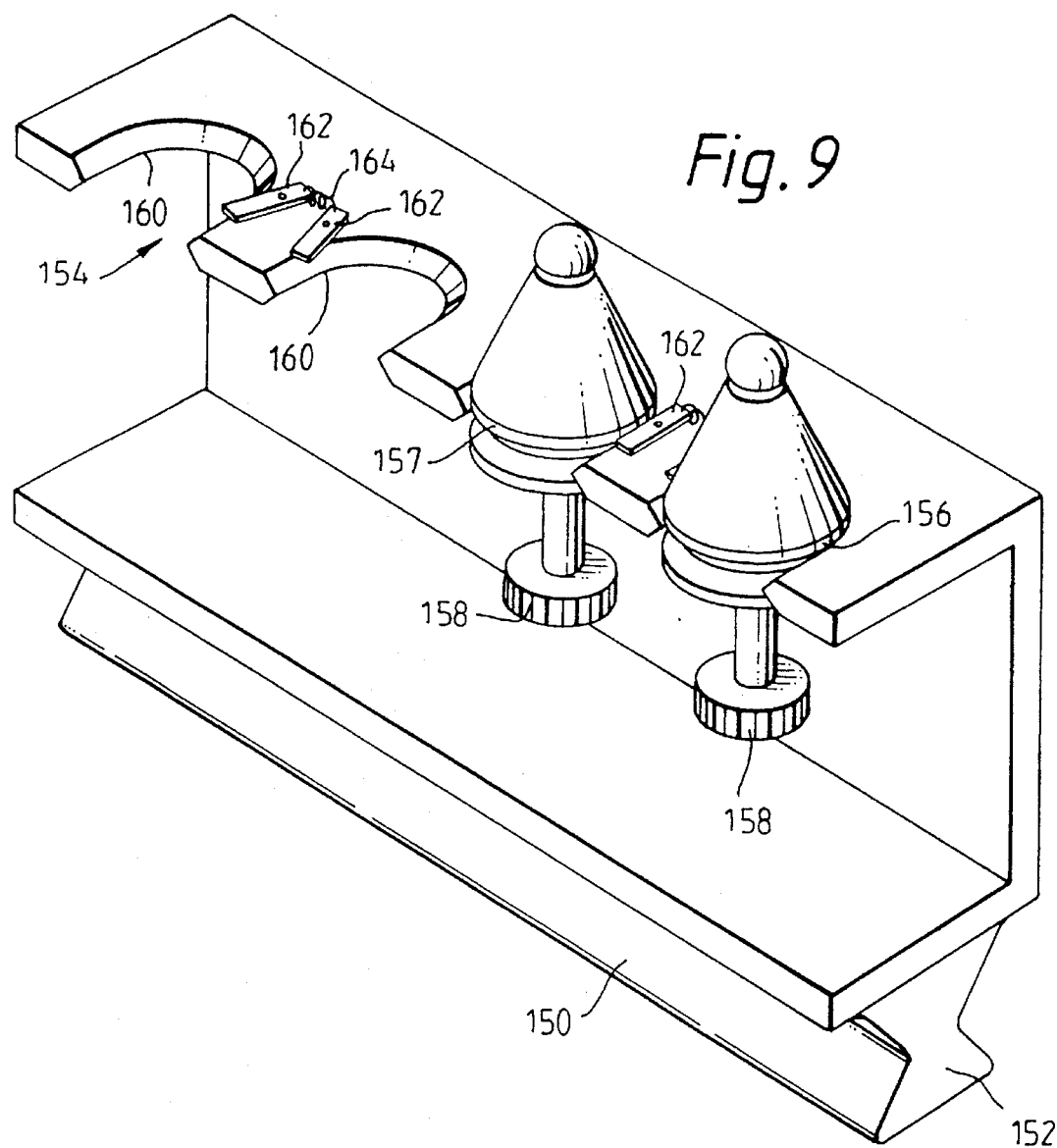
Figure 8:
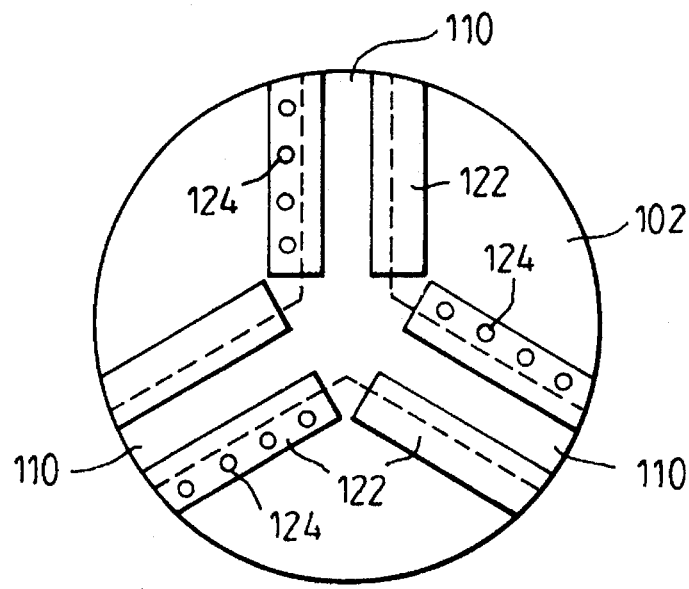
Figure 10:
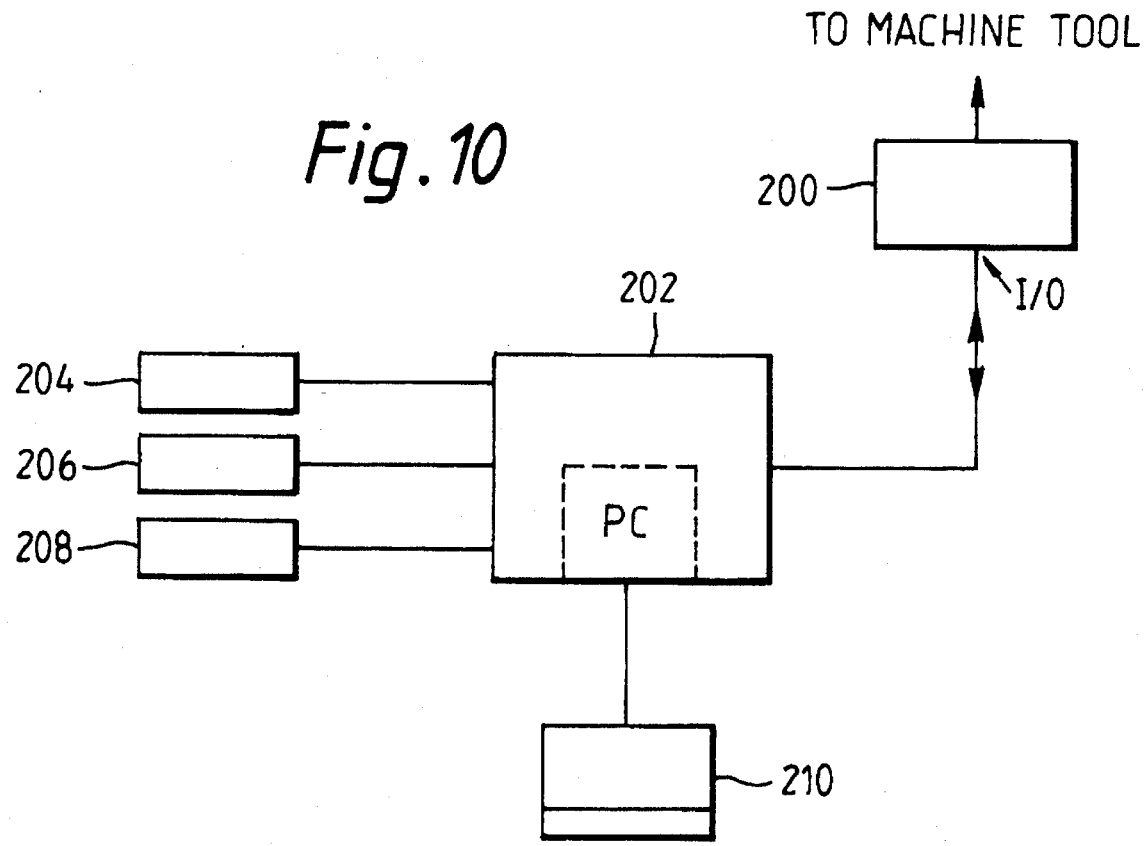

FIG. 5 is an enlarged view of one of the links of the cassette-loading system,

FIG. 6 is a schematic representation of the embodiment of the invention in a horizontal spindle machine tool, FIG. 7 is a plan view of the machine tool of FIG. 6, FIG. 8 is a plan view of an alternative cassette-receiving device of the invention for receiving multiple cassette, FIG. 9 shows a cassette which holds a plurality of artefacts on shanks, and FIG. 10 is a schematic diagram of the control system required to control the pallet handling system of the invention.

Referring now to FIGS. 1 and 2 of the drawings there is shown a machine tool 1 having an indexing spindle 2 which is rotatable about a first axis 2A and a machining spindle 3 which is rotatable about a machining axis 3A. In this example, the machine tool may be a conventional vertical spindle CNC machine having a computer for controlling its various operations. Such a computer control is now well-known in the art and is not therefore described in detail. A diagrammatic representation of the computer is shown by reference 5 in FIG. 3.

Connected to the indexing spindle 2 for rotation therewith is a cassette-receiving device 4 which may be as described in International Publication No. WO91/04127. The cassette receiving device is elongate and has an axis 4A which, in this example, is co-linear with the rotary axis 2A of the indexing spindle. In other examples, not shown, the axis of the cassette-receiving device may be parallel with but not necessarily co-linear with the axis of the indexing spindle. At the end opposite to the indexing spindle 2 the cassette-receiving device is further supported on a tailstock 9 of the machine. The tailstock is not essential and can be eliminated if the stiffness of the cassette allows.

Three cassette-locating features are provided on the periphery of the cassette-receiving device and are spaced equally around said axis 4A and extend in a direction parallel thereto. The cassette locating features, as can be seen in FIG. 2, are defined by a flat surface 4B on the periphery of the device which is partially overlaid on one side by a fixed clamping plate 6, and on the other side by a movable clamping plate 7. The two plates extend at an angle to the flat surface to define a dovetail slot extending along the periphery of the device and capable of receiving correspondingly shaped locating features on the cassette 10 in the form of surfaces 11 and 12 forming a dovetail shape. This arrangement is more fully described in the above-mentioned International Publication No. WO 91/04127 which is hereby incorporated into this specification by reference. The cassettes 10 are clamped by tightening of clamping bolts 8 on the movable clamping plate 7 which may be done automatically by the machine tool as described later herein.

The above-described arrangement in which the cassettes are mounted on the periphery of the cassette-receiving device, which itself is mounted on the rotary axis of the indexing spindle allows for a single tailstock 4 to be used for supporting multiple cassettes both during the loading and unloading process but also during the machining process.

The cassettes are loaded onto and removed from the cassette-receiving device by a cassette-loading system 15 which may be portable and is set up on repeatable and adjustable mounts adjacent to the machine tool. The loading system includes a stand 16 supported on kinematic seats 14 on the floor and supporting a chain conveyor 17 which is formed from a plurality of extruded links 18 connected together side by side by pivots 19 formed at the sides of each link (FIGS. 4 and 5). The pivots provide pivoting axes 19A which extend parallel to the longitudinal axes of the extrusions (and transversely to the length of the conveyor) to enable the conveyor to form a continuous chain. At each end of the stand there is provided a rubber guide wheel (not shown) to guide the extrusions through the 180° turn. Axles 20 pass through the extrusions on the pivoting axes 19A, to the ends of which are attached wheels 21 to provide additional support and guidance to the conveyor.

By forming the links of the conveyor as extrusions of a lightweight material, e.g. Aluminium, the whole cassette-loading system can be made at relatively low cost.

Each extrusion is formed with cassette-retaining features, which for convenience in the extrusion process are formed as pairs of cylindrical surfaces 22,23,24,25 so arranged as to be capable of receiving and engaging the dovetail locating features (11,12) provided on each side of the cassettes 10 as can be seen in FIG. 4. The cassettes, when in position with the locating features engaged, extend outwardly from the extrusion to provide exposed end and side faces on which are provided the required artefacts 26 e.g. tools, chucks, or workpieces, for the machine tools. The cassettes themselves may form workpieces, the machine tool performing appropriate machining operations on the exposed surfaces thereof.

Extending inwardly from each extrusion and integrally formed therewith at the location of each pivot 19, is a forked abutment 29 which is engaged by the drive mechanism described below for moving the conveyor backwards or forwards between the machine tools.

The drive mechanism (FIG. 4) includes a lever 30 pivoted at one end to one end of a second lever 31, and having a fork 32 at its other end for engaging the forked abutment 29 on the conveyor. The lever 30 is connected to a hydraulic piston and cylinder arrangement 33 for moving it backwards or forwards between end stops 34 and 35. The second lever 31 forms part of an engagement mechanism for engaging and disengaging the lever 30 from the conveyor, and for locking the conveyor in position when the lever 30 is disengaged. The engagement mechanism further includes a hydraulic piston and cylinder arrangement 37 connected to the end 31A of the lever 31 opposite to that at which the lever 30 is connected. The lever 31 is pivoted at a point 38 about midway between its ends. Between the pivot point 38 and the end 31A of the lever is an arm 40 connected to a locking lever 41 which has a forked end 42 for engaging the forks 29 on the extrusion.

In operation, when the conveyor requires to be moved, a signal is sent from the control system (FIG. 10) to the hydraulic actuators respectively of the two piston and cylinder arrangements 33,37 to cause arm 40 to be depressed to disengage the forked end 42 of lever 41 from, and to engage the forked end 32 of lever 30 with, the forks 29 of respective extrusions. Feedback signals are required from the actuators so that a local control circuit shown diagrammatically at 55 (which forms part of the overall control system) for controlling the actuators.

The piston and cylinder 33 then moves the lever 30 between the end stops to move the conveyor by one distance interval equal to the spacing between the centers of the extrusions.

On completion of this movement the piston and cylinder 37 is actuated to pivot lever 31 to re-engage the forked end 42 of lever 41 with, and to disengage the forked end 32 of lever 30 from, the forks 29 of the respective extrusions. Once disengaged from the extrusion the lever 30 is pivoted back to the opposite end stop by piston and cylinder arrangement 33, ready to repeat the operation. The conveyor may be moved in the opposite direction by suitably modifying the above described sequence of operations.

It is to be understood that other mechanisms may be used for moving the conveyor backwards and forwards and that the above-described mechanism is simply one example of such mechanisms.

To transfer the cassettes from the loading system to the machine tool and back again there is provided a cassette transfer mechanism (shown in FIG. 1) which includes an actuator which in this example takes the form of a rodless pneumatic cylinder 50 attached to a fixed gantry 51 above the machine tool so that it lies outside of the working volume of the machine tool. Attached to the pneumatic cylinder is a block 52 having a detent 55 which engages in a slot cut in each cassette 10 for pushing or pulling the cassette axially onto and off the machine tool. The detent is shown engaging a slot cut in the top of a cassette, but other positions for the slot may be used, for example, the underside of the cassette, if more convenient, in which case the detent will be required to pivot to engage and dis-engage from the slot. The block 52 is shown in dotted lines at the other end of its travel where it comes up against an end stop 53.

The feature, that the actuator for the transfer mechanism is mounted outside the working volume of the machine tool, is believed to be novel and inventive in that it does not take up useful working space and, in combination with the portability of the cassette-loading system enables the whole pallet handling system to be retrofittable to machine tools.

Spanning the gap between the conveyor and the cassette-receiving device is a transfer guide 54 which is attached to the machine tool and has a plurality of guide wheels 56 shaped to engage the faces 11,12 of the dovetail location features on a cassette and aligned with the corresponding location features on the core. Guide wheels 57 are also provided on the cassette-loading system to ensure alignment between the location features of the cassettes, the conveyor and the transfer guide as the cassettes are transferred between the conveyor and the machine tool. Also to ensure smooth transfer of the cassettes onto the loading mechanism each of the extrusions is provided at least at one end with tapered guides 58 extending transversely to the direction of conveyor movement.

Other transfer mechanisms are not excluded from the scope of the invention however, for example, a pick and place robot system could be employed.

The present invention enables a flexible machining system to be provided which is relatively inexpensive in that the present expensive dedicated pallets for holding workpieces or tools are replaced by the cheap cassettes, which may, for example, be aluminium extrusions.

The cassettes may be themselves workpieces, or may act as fixtures for workpieces, as described in International Application No. WO91/04127. When such cassettes are loaded onto the machine tool, as shown in FIG. 1, the computer of the control system commands the machine to pick up a socket or screwdriver to rotate the nuts 8 to effect clamping of the cassette onto the cassette-receiving device.

In a fully automated system however, it is necessary to provide the machine tool with tooling to carry out the necessary machining operations. This is facilitated with the cassettes and loading arrangement of the present invention, by using some of the cassettes for loading the required spindle mounted cutting tools, and some for providing the required fixed tooling.

One or more cassettes may carry tools for spindle mounted machining operations which may be sequentially presented to the machine tool. The spindle is programmed to pick them from the cassettes and place them in the tool holder of the machine tool where there are stored for a complex machining operation using many different tools. For simple operations requiring only one or two tool changes, however, the tool-holding cassette can be left in place in one of the positions on the core and act as a cheap toolholder where a machine tool may not have one of its own. Alternatively, when the tools in a cassette have been used to perform their machining functions, another cassette loaded with different tools can be substituted from the cassette-loading system without disturbing the cassettes holding the previously machined workpieces.

Other cassettes may have fixed tools clamped thereon, for example, turning or even drilling tools as shown in FIG. 2. The tools can be clamped in a cassette in the same manner as they would be clamped in a tool holder on a lathe by a grub screw 60 FIG. 2. Thus a workpiece held in a chuck on the machine spindle can be rotated against the fixed tooling in a cassette.

Other cassettes can hold workpieces in chucks for mounting in the spindle, or the chucks may be included in the tool-carrying cassettes holding spindle-mounted tools so that the machine tool can deposit one or more chucks in its toolholder for picking up workpieces when required. Measuring probes may also be loaded into a cassette for transfer to the toolholder of the machine.

In a novel use of the loading and indexing features of the present invention, calibration artefacts may be carried by some cassettes. These will be left in a cassette on the cassette-receiving device while machining operations are being carried out on workpieces held in another cassette in another of the positions on the cassette-receiving device. After machining the machine spindle is programmed from the control system to pick up a measuring probe, and measure the workpiece just machined. The cassette-receiving device can then be rotated to present the artefact-carrying cassette to the spindle and a master artefact measured to determine any differences. Because the master artefact has been exposed to the same conditions as the workpiece, it will be at the same temperature as the workpiece, and because it is measured in the same position as the workpiece, errors due to temperature differentials and movement of the machine spindle to a measuring location can be eliminated giving much more accurate workpiece production. Also since the indexing of the cassette-receiving device can take place at high speed, the measuring process is quite rapid thus enhancing the productivity of the machine tool.

The cassette-receiving device illustrated in the figures is multi-facetted, i.e. it has facets on its periphery for mounting more than one cassette extending radially therefrom. This means that the cassette-receiving device takes up a significant amount of the machining space available and the spindle has to travel significant distances to move to the extremities of the cassettes and the size of the cassettes becomes limited.

In an alternative embodiment the cassette-receiving device is single facetted and contains a single cassette within it so that the cassette occupies the volume including the axis of rotation of the cassette-receiving device. This allows a larger cassette to be used which, with an automatic loading system as described above, has advantages. To load the cassette axially onto the cassette-receiving device, it must be passed through the tailstock bearing which requires the tailstock to be supported on an external bearing.

In a further alternative embodiment the invention may be applied to a horizontal spindle CNC machine tool as illustrated in FIGS. 6,7 and 8.

Referring now to the FIGS. 6 and 7, the machine tool may be of any known type, the basic elements of which are, a machine bed 100, on which is supported a rotary indexing table 102 capable of rotation about a vertical indexing axis 103, and a spindle head 104 supporting a spindle 105 capable of rotation about a horizontal spindle axis 106. The motors used for driving the table and the spindle are conventional and are not shown, nor is the CNC control system for driving them.

The table which forms the cassette-receiving device is provided with at least one dovetail groove therein. Only a single such groove 110 is shown in FIG. 7 which extends the full length of the diameter of the table 102. The groove 110 is shaped to receive correspondingly shaped dovetail surfaces 112 provided on cassettes 114 stored on the cassette-loading system, and may receive one large cassette or a number of smaller ones for optimising the number of artefacts presented to the machine tool. Alternatively, different numbers and arrangements of grooves may be utilised, for example, three radial grooves as shown in FIG. 8.

Each cassette which, as described above, may hold one or more workpieces or tools, or which may itself form a workpiece, is transferrable from the cassette-loading system 15 to the table by the transfer mechanism 50. To achieve this the table is rotated until the groove 110 is aligned with its axis parallel to the spindle axis 106, and the axis of the dovetail surface 112. Then the transfer mechanism is actuated to slide the cassette into the groove on the table under the clamps 122. The spindle is loaded with a spanner to operate the clamping nuts 124 to clamp the workpiece securely. Once the desired number of cassettes has been loaded, the appropriate tooling is supplied to the spindle, either from a cassette, or from a previously loaded conventional tool-holding carousel on the machine tool and machining of the workpiece is carried out in the normal way, using the rotary table to present different faces of the workpieces to the tools in the spindle.

The rotation of the table about the vertical axis enables three faces of a cassette and thus the workpieces it carries to be reached by the spindle-mounted tool.

Where multiple workpieces are carried by the cassette and the cassette is elongate in the horizontal direction with workpieces stacked horizontally, i.e. as described in U.K. patent application no. 9113115.1, only one or two faces of the workpieces carried can be machined.

However, by changing the aspect ratio of the cassette so that it has greater height, as shown in FIG. 6, and by stacking the workpieces vertically, more faces can be machined.

Thus by using multiple cassettes with multiple workpieces, various faces of a larger number of workpieces can be reached by the spindle to optimise work throughput.

Where multiple tall, thin cassettes are used a central rigid body may be provided, standing up from the cassette-receiving device in the direction of the rotary axis thereof on which detents or recesses are provided to cooperate with corresponding recesses or detents on the edges of the cassettes to provide additional rigidity for machining operations.

Referring now to FIG. 9, there is shown a cassette adapted for storing rotary cutting tools such as milling cutters and drills, or workpieces in chucks, all of which have shanks for being picked up in the machine spindle by conventional tool gripping devices.

The cassette has a dovetail groove 150 formed in its base 152 to enable the cassette to be located in the correspondingly shaped groove on a cassette-receiving device. The body of the cassette is simply a channel section extending upwardly from the base, the top surface of which is cut away to provide a plurality of recesses 157 for holding the collar 156 of a tool or chuck 158.

The internal periphery of each recess 154 is formed with an annular projection 160 which fits into the conventional vee-groove formed in the tool or chuck collar to retain the collar in the recess. A clamping device comprising a pair of pivoting plates 162, urged apart by a spring 164, apply force to the tool collars to prevent them falling out of the cassette-loading device as it is moved around to position the cassettes.

FIG. 10 illustrates diagrammatically, how the control of the automatic pallet loading system of the present invention can be integrated with the machine controller.

The CNC machine controller 200 is programmed to send instructions to an integrated control system 202 and to receive answering data therefrom via its input/output port. The instructions sent by the controller 200 are high level instructions for example, to change a cassette or a tool.

The control system 202 includes a computer, which is preferably a personal computer (PC) which is linked to the drives and actuators for the indexing spindle 204, the cassette-loading system 206, and the transfer mechanism 208. The PC is programmed on receipt of such high level instructions, to send commands to the various actuators to drive the cassette-loading conveyor, the indexing spindle and the transfer mechanism to position appropriate cassettes in relation to the spindle or to return cassettes to the cassette-loading system. When the cassette is in position, the PC sends a confirming signal back to the CNC control, to continue with its control programme.

A standard monitor and keyboard 210 may be added to enable further instructions to be manually input to the control system 202 if required.

A novel feature of all of the above-described embodiments of the invention is that the same locating features on a cassette which enable the cassette to be located and clamped on the cassette-receiving device, are utilised to locate the cassette on the cassette-loading system. This leads to a much simplified transfer mechanism in which all that is needed is to align the cassette-locating features on the loading system with the cassette-locating features on the cassette-receiving device, and then the cassettes can be loaded or off-loaded by a forward or reverse sliding movement. The cassette-locating and clamping features on the core will ensure that each cassette is accurately positioned in the same place on the core. Thus the invention provides for a single loading and unloading arrangement to provide the machine tool with workpieces, fixed tools, cutting tools or workholders. Also, because the indexing spindle is used to position the cassettes relative to the transfer mechanism, in a preferred form the transfer mechanism can be a simple fixed linear push-pull device.

The invention described above gives significant flexibility in the methods of machining which can be used in manufacturing workpieces.. Thus, for example, all of the tools required for producing a product may be loaded into one or more tool-holding cassettes at a remote loading station and stacked along with sufficient workpiece-holding cassettes to provide the requisite number of workpieces for a given batch, on the cassette-loading system. The lightweight cassette-loading system can then be brought to the machine tool. The machine tool can be programmed to load each cassette in sequence onto the cassette-receiving device. For safety reasons, each cassette may carry some means of identification which, for example, can be detected by a probe on the machine tool to stop the machine tool if there are problems. The movement of the machine tool and the loading system may then be programmed to carry out any of the following methods of operation.

When the machine tool with which the artefact handling system is associated has its own tool-holding system and control, one or more cassettes containing the required tooling for an unmanned production run can be loaded. The machine spindle is programmed to remove the tools from the cassettes and load them into the toolholder, and the controller actuates the loading system to remove the empty cassettes replacing them with more tool-holding cassettes if required. Cassettes holding workpieces, or sacrificial cassettes acting as workpieces can then be loaded and unloaded by the commands from controller to the cassette-loading system, which also controls the indexing of the cassettes to present the appropriate faces of the workpieces to the spindle and the collection of tools from the toolholder in order to carry out the pre-programmed sequence of machining operations.

Where the machine tool has no toolholder, one of the cassettes containing tools may be stored on the cassette-receiving device while other cassettes containing workpieces are loaded onto and off the cassette-receiving device. In these circumstances the machine controller is programmed to index the cassette-receiving device to present the tool-holding cassette to the machining spindle to pick up and replace tools from the tool-holding cassette in between indexing the workpiece-holding cassettes to present workpieces to the tool held in the spindle. It is a matter of convenience whether the controller is programmed to move workpiece-holding cassettes onto and off the cassette-receiving device to perform one operation on all of the workpieces stored on the cassette-loading system while one tool is retained in the spindle, or whether the tools are changed to perform all operations on the workpieces held in the cassettes on the cassette-receiving device before the workpiece-holding cassettes are changed to provide new workpieces for machining.

It can be seen that the ability to change cassettes on the cassette-receiving device independently of other cassettes which remain stored on the cassette-receiving devices provides a unique flexibility to the machine tool. In comparison with a machine tool having a conventional rotary pallet system, this novel aspect of the invention gives the ability of changing workpieces on the pallet without having to change the pallet.

In yet another example of the versatility of the present invention in the machining of workpieces, the method of operation described below exemplified how a standard vertical spindle milling machine tool can be provided with a turning capability, thus converting it into a milling-turning machine tool.

As a first step the cassette-loading system is loaded with cassettes which contain the required milling cutters, turning tools, workpieces requiring a milling operation, and chucks holding workpieces requiring a turning operation. It is to be noted that the workpieces requiring a milling operation may have already undergone the turning operation and vice versa.

Once loaded onto the cassette-loading system the control system is programmed to:

a) load a cassette containing the milling tools. These may be transferred by the machine spindle to the machines toolholder if it has one and the empty cassette re-loaded onto the loading system.

b) load one or more cassettes containing (or being) the workpieces requiring a milling operation.

c) perform the milling operation on the workpieces. N.B. at this stage the cassettes may be returned to the loading system and further cassettes loaded while the milling cutters are in place.

d) swap the cassettes for cassettes containing chucks holding the workpieces requiring a turning operation, which the machine spindle may store in the toolholder of the machine tool if space is available.

e) load one or more cassettes containing the turning tools.

f) perform the turning operation by rotating the workpieces in the spindle against the static turning tools.

Again it will be understood that these operations can be carried out in any order.

At present it is envisaged that the milling turning sequence of operations will require a two-part operation in which the workpieces are removed from the machine tool after a first one of the operations and re-loaded in appropriate manner into cassettes for the next operation.

Another novel feature of the invention is that the cassettes are of rectangular shape with their greatest dimensions extending in the directions of the axes of the two spindles. Thus large numbers of cassettes can be stored side-by-side on the cassette-loading system taking up a relatively small amount of floor space compared to the conventional flat square pallet systems.

Another novel feature of the design is that the indexing spindle is capable of positioning the cassette-receiver such that the machining spindle may access multiple faces of multiple cassettes mounted on the periphery of the receiver, and wherein each cassette may carry multiple workpieces.

We claim:

1. An automated artefact handling system for a machine tool, the machine tool having an indexing spindle rotatable about a first axis and a machining spindle rotatable about a second axis, the artefact handling system comprising:

a cassette-receiving device, a plurality of artefact-providing cassettes each having first cassette locating features thereon, said cassette-receiving device having an axis and having a plurality of second cassette locating features thereon which are spaced around said axis and which cooperate with the first cassette locating features on the cassettes to receive and locate the cassettes in position on said device, and clamping means for holding the cassettes in said position, said cassette-receiving device being mounted on the indexing spindle with its axis parallel to the first axis to position the cassettes relative to the machining spindle for an operation by the machining spindle on artefacts provided by the cassettes, a cassette-loading system on which said cassettes are stored which is positionable adjacent to the machine tool and which includes drive means for positioning a desired cassette relative to the cassette-receiving device, and a cassette transfer mechanism for transferring the cassettes between the cassette-loading system and the cassette-receiving device, and control means for automatically controlling said drive means, said cassette transfer mechanism, the clamping means and said machine tool to provide the correct artefacts to the machine tool in accordance with a pre-programmed sequence of machining operations.

2. An automated artifact handling system as claimed in claim 1 wherein the cassette-loading system is portable and is provided with first mounting elements which co-operate with second mounting elements adjacent the machine tool to enable the system to be removed and repeatably re-located in position.

3. An automated artifact handling system as claimed in claim 1 wherein the cassette-loading system includes cassette-retaining features thereon which co-operate with the first features on the cassette.

4. An automated artifact handling system as claimed in claim 1 wherein the cassette transfer mechanism comprises means for causing linear movement of a cassette between the cassette-loading system and the cassette-receiving device for loading and unloading the cassettes onto and off the cassette-loading device.

5. An automated artifact handling system as claimed in claim 1 wherein the cassette transfer mechanism is fixed to a static structure of the machine.

6. An automated artifact handling system as claimed in claim 1 wherein the cassette transfer mechanism comprises a fixed actuator which is positioned outside a working volume of the machine tool, and means movable by the actuator which extends inwardly towards the artifact handling system and which includes means engageable with a cassette to enable transfer of the cassette between the cassette-loading system and the cassette-receiving device to take place.

7. An automated artifact handling system as claimed in claim 1 wherein the cassette-receiving device is mounted on the indexing spindle for rotation about an axis co-linear with the first axis, the clamping means is provided on a plurality of peripheral surfaces of the cassette-receiving device whereby a plurality of the cassettes may be simultaneously held on the cassette-receiving device, and wherein the control means is operable to cause indexing of the cassette-receiving device, and subsequent operation of the cassette transfer mechanism to cause a single cassette to be loaded onto or removed from the cassette-receiving device independently while any other cassettes on the cassette-receiving device remain undisturbed.

8. An automated pallet handling system as claimed in claim 1 wherein the cassettes are designed to carry artefacts selected from any of the following:

a) fixed tools for turning or drilling operations on a rotatable workpiece, or
   b) rotatable tooling for mounting in the machining spindle for performing machining operations on a non-rotating workpiece, or
   c) workpieces, or
   d) calibration artefacts for making comparative measurements of workpieces, or
   e) measuring probes.

9. An automated artifact handling system as claimed in claim 1, wherein said second axis of said machining spindle is orthogonal to said first axis.

10. An automated artifact handling system as claimed in claim 1, wherein said second cassette locating features on the cassette-receiving device extend parallel to the axis of said cassette-receiving device.

11. An automated artifact handling system as claimed in claim 1, wherein the second cassette locating features on the cassette-receiving device extend radially to the axis of said cassette-receiving device.

12. An automated artifact handling system as claimed in claim 1 wherein the cassette-loading system comprises a conveyor having a plurality of chain links mounted side-by-side and interconnected by pivotal joints.

13. An automated artifact handling system as claimed in claim 12 wherein the drive means of the cassette-loading system comprises a pivoting lever one end of which is engageable with and disengageable from means provided on each link, and actuating means for causing said engagement and disengagement and for causing pivoting of said lever to drive the links forwards or backwards in stepwise movements.

14. An automated artifact handling system as claimed in claim 13 wherein the actuating means further comprises locking means, engageable and disengageable with the links for locking the links in position after each stepwise movement and unlocking the links to allow for a next stepwise movement.

15. A method of operating an automated artefact handling system for a machine tool having an indexing spindle rotatable about a first axis and a machining spindle rotatable about a second axis, said automated artefact handling system including: a cassette-receiving device; a plurality of artefact-providing cassettes each having first cassette locating features thereon; said cassette-receiving device having an axis and having a plurality of second cassette locating features thereon which are spaced around said axis and which cooperate with the first cassette locating features on the cassettes to receive and locate the cassettes in position on said device, and clamping means for holding the cassettes in said position, said cassette-receiving device being mounted on the indexing spindle with its axis parallel to the first axis to position the cassettes relative to the machining spindle for an operation by the machining spindle on artefacts provided by the cassettes; a cassette-loading system on which said cassettes are stored which is positionable adjacent to the machine tool and which includes drive means for positioning a desired cassette relative to the cassette-receiving device, a cassette transfer mechanism for transferring the cassettes between the cassette-loading system and the cassette-receiving device, and cassette-retaining features which cooperate with the first locating features on the cassettes; and control means for automatically controlling said drive means, said cassette transfer mechanism, the clamping means and said machine tool to provide the correct artefacts to the machine tool in accordance with a pre-programmed sequence of machining operations; said method comprising the steps of:

operating the cassette-loading system to align the cassette-retaining features of the cassette-loading system with the second cassette-locating features of the cassette-receiving device, operating the cassette transfer mechanism to cause a linear movement of a cassette mounted on the cassette-loading system towards the cassette-receiving device to disengage the cassette from the cassette-retaining features on the cassette-loading system and to engage the cassette with the second cassette-locating features on the cassette-receiving device.

16. A method as claimed in claim 15 wherein said linear movement is continuous.

17. A method of operating an automated artefact handling system for a machine tool having an indexing spindle rotatable about a first axis and a machining spindle rotatable about a second axis, said automated artefact handling system including: a cassette-receiving device; a plurality of artefact-providing cassettes each having first cassette locating features thereon; said cassette-receiving device having an axis and having a plurality of second cassette locating features thereon which are spaced around said axis and which cooperate with the first cassette locating features on the cassettes to receive and locate the cassettes in position on said device, and clamping means for holding the cassettes in said position, said cassette-receiving device being mounted on the indexing spindle with its axis parallel to the first axis to position the cassettes relative to the machining spindle for an operation by the machining spindle on artefacts provided by the cassettes; a cassette-loading system on which said cassettes are stored which is positionable adjacent to the machine tool and which includes drive means for positioning a desired cassette relative to the cassette-receiving device, and a cassette transfer mechanism for transferring the cassettes between the cassette-loading system and the cassette-receiving device; and control means for automatically controlling said drive means, said cassette transfer mechanism, the clamping means and said machine tool to provide the correct artefacts to the machine tool in accordance with a pre-programmed sequence of machining operations; said method comprising the steps of:

loading the cassette-loading system with at least two artefact-providing cassettes, programming the control means to carry out the following sequential functions, rotating the indexing spindle to cause the cassette-receiving device to be indexed to a position in which it can receive a first one of the cassettes, operating the drive means of the cassette-loading system to position said one of the cassettes opposite to the cassette-receiving device, rotating the indexing spindle to cause the cassette-receiving device to be indexed to another position in which it can receive another cassette, operating the drive means of the cassette-loading system to position another one of the cassettes opposite to the cassette-receiving device, and operating the cassette transfer mechanism to transfer said other one of the cassettes from the cassette-loading system onto the cassette-receiving device.

18. A method of operating an automated artifact handling system as claimed in claim 17 wherein one of said two cassettes is provided with tools, and the other one is provided with workpieces whereby the machine tool is loaded with both the tools and the workpieces by the same cassette transfer mechanism.

19. A method of operating a machine tool which includes an automated artefact handling system, said machine tool having an indexing spindle rotatable about a first axis and a machining spindle rotatable about a second axis, said artefact handling system including: a cassette-receiving device; a plurality of artefact-providing cassettes each having first cassette locating features thereon; said cassette receiving device having an axis and having a plurality of second cassette locating features thereon which are spaced around said axis and which cooperate with the first cassette locating features on the cassettes to receive and locate the cassettes in position on said device, and clamping means for holding the cassettes in said position, said cassette-receiving device being mounted on the indexing spindle with its axis parallel to the first axis to position the cassettes relative to the machining spindle for an operation by the machining spindle on artefacts provided by the cassettes; a cassette-loading system on which said cassettes are stored which is positionable adjacent to the machine tool and which includes drive means for positioning a desired cassette relative to the cassette-receiving device, and a cassette transfer mechanism for transferring the cassettes between the cassette-loading system and the cassette-receiving device; and control means for automatically controlling said drive means, said cassette transfer mechanism, the clamping means and said machine tool to provide the correct artefacts to the machine tool in accordance with a pre-programmed sequence of machining operations; said method comprising the steps of:

loading the cassette-loading system with artefact-carrying cassettes including workpieces, milling tools and static turning tools, programming the control means to carry out the following functions:

a) operating the cassette-loading system, the indexing spindle and the cassette transfer mechanism to load onto the cassette-receiving device, at least one workpiece-providing cassette and a tool cassette carrying one of a milling tool or a cutting tool, b) using a tool provided by the tool cassette, performing one of a milling or turning operation on a workpiece provided by the workpiece-providing cassette, c) operating the cassette-loading system, the indexing spindle and the cassette transfer mechanism to load onto the cassette-receiving device, at least one workpiece-providing cassette and a tool cassette carrying the other one of a milling tool or a cutting tool, and d) using a tool provided by the tool cassette performing the other one of the milling or turning operation on a workpiece provided by the workpiece-providing cassette.

20. An artefact handling system for a machine tool, having an indexing spindle rotatable about a first axis, said system comprising a plurality of artefact holding cassettes each having locating features thereon, a cassette-receiving device which includes locating and clamping means for co-operating with the locating features on the cassettes to accurately locate and clamp the cassettes in position thereon, said cassette-receiving device being mounted on the indexing spindle of the machine tool for rotation therewith to position the cassettes in relation to the indexing spindle, wherein the artefacts held by the cassettes comprise both tools and workpieces, and the system further comprises:

a cassette-loading system on which said cassettes are stored which is positionable adjacent to the cassette-receiving device and which includes drive means for positioning a desired cassette relative to the cassette-receiving device, and a cassette transfer mechanism for transferring the cassettes between the cassette-loading system and the cassette-receiving device, in order to provide said tools and said workpieces to the machine tool, and control means for automatically controlling said drive means, said cassette transfer mechanism, the locating and clamping means and said machine tool to provide the correct tools or workpieces to the machine tool in accordance with a preprogrammed sequence of machining operations.

\* \* \* \* \*